United States Patent [19]
Yong-Set

[11] Patent Number: 6,141,839
[45] Date of Patent: Nov. 7, 2000

[54] CLIP FOR ATTACHING LURES TO A FISHING LINE

[76] Inventor: Bernard Yong-Set, 63 Chapel Park Square, Scarborough, Canada, M1V 2S3

[21] Appl. No.: 09/262,055

[22] Filed: Mar. 4, 1999

Related U.S. Application Data

[60] Provisional application No. 60/077,593, Mar. 9, 1998.

[51] Int. Cl.[7] .................................................. A44B 21/00
[52] U.S. Cl. ............................................ 24/601.8; 24/375
[58] Field of Search ............................ D22/134; D8/382, D8/395; 43/44.92, 44.83; 24/601.3, 601.8, 601.1, 601.9, 908, 698.3, 131 R, 373, 375; 59/83

[56] References Cited

U.S. PATENT DOCUMENTS

| | | |
|---|---|---|
| D. 175,801 | 10/1955 | Sharps . |
| D. 256,942 | 9/1980 | McMickle . |
| D. 393,688 | 4/1998 | Essad . |
| 676,981 | 6/1901 | Ellsworth . |
| 3,122,803 | 3/1964 | Boggess et al. . |
| 3,335,472 | 8/1967 | Imai . |
| 4,004,328 | 1/1977 | Bohn et al. . |
| 4,234,998 | 11/1980 | McMickle . |
| 5,655,329 | 8/1997 | Yong-Set . |

*Primary Examiner*—James R. Brittain
*Attorney, Agent, or Firm*—Ridout & Maybee

[57] ABSTRACT

A clip for attaching a fishing lure or hook to a fishing line comprises an elongate body having a central support member bridging first and second loop portions formed at respective proximal and distal ends of the clip. The support member has a shoulder intermediate its length which reduces the width of the clip near its distal end. The first loop portion is adapted to open, and includes an arm member having a first end connected to the support member through a bend at one end of the clip, and a U-shaped hook member connected to a second end of the arm member. In the open configuration of the clip, the U-shaped hook member is disengaged from the remainder of the clip, and in its closed configuration, the U-shaped hook member is received around the support member at a point distal to the shoulder, such that the presence of the shoulder effectively reduces the displacement of the arm between its open and closed configurations, thereby reducing fatiguing of the metal comprising the clip.

15 Claims, 2 Drawing Sheets

CLIP FOR ATTACHING LURES TO A FISHING LINE

This application claims the benefit of U.S. provisional application Serial No. 60/077,593, filed Mar. 9, 1998.

FIELD OF THE INVENTION

The invention relates to clips for attaching objects to the end of a line, and specifically to clips which are used to attach a fishing lure or hook to the end of a fishing line.

BACKGROUND OF THE INVENTION

Metal clips are commonly used to attach a fish hook or lure to the end of a fishing line, thereby avoiding the need to cut the line and re-tie a new knot every time a hook or lure is changed. Such clips must be small and lightweight so as not to be visible to fish or impede the movement of the fishing lure, and must also be strong and easy to open while resisting unintentional opening.

A typical clip for attaching a lure to a fishing line comprises an elongate body formed from a single strand of resilient, corrosion resistant wire and having loops at its opposite ends. One loop can be opened for attachment to the eyelet of a fish hook or lure, and the other loop preferably remains closed and is adapted to connect to a fishing line by a knot or an intermediate swivel connection. The loop which connects to the lure is typically closed by applying a force to a biasing arm member having a U-shaped hook at its end, forcing the hook to wrap around a portion of the clip and be retained in position by the biasing force of the arm. Opening the clip is accomplished by squeezing the loop to overcome the biasing force and allow the U-shaped hook to spring free from the remainder of the clip.

A number of different clips of this type are known in the prior art, however none has proved to be completely satisfactory. One example of a known clip is disclosed in U.S. Pat. No. 5,655,329 to Yong-Set, issued Aug. 12, 1997. Yong-Set discloses a straight-backed clip having the features described above, comprising an elongate body having loops at its opposite ends, and having a straight support member bridging the two loops. The smaller loop of the Yong-Set clip has an extension in the form of a ring which is substantially perpendicular to the two loops comprising the clip. The clip is closed by passing the U-shaped hook through the ring and hooking it around the support member. While the Yong-Set clip is designed to resist unintentional opening, even after becoming deformed by a relatively large tensile load, it has been found to be relatively difficult to open since the hook must be disengaged from the back member of the clip and passed through the ring before the clip will open.

U.S. Design Pat. No. D256,942 to McMickle discloses a straight-backed clip which eliminates the ring of the Yong-Set clip and is therefore of simpler construction. The McMickle clip is also closed by squeezing the biasing arm member of the clip so that the hook will wrap around the straight support member of the clip and be retained by the biasing force of the arm member. While the McMickle clip is simple in design, it has been found that when the clip is opened the biasing force is such that the biasing arm does not spring back far enough to permit the easy addition or removal of a fishing lure or hook. It is necessary to bend the biasing arm backward to adequately open the clip, and repeating this procedure results in fatigue of the metal and eventual breakage of the clip when it becomes lodged against an underwater obstacle or when it hooks a fish.

Furthermore, the biasing force present in the biasing arm when the clip is in the closed position is minimal and may result in the unintentional opening of the clip. The lower biasing force of the biasing arm is due to the fact that it must travel to the opposite side of the straight back member before it can engage the member to close the clip, resulting in a great amount of stress in the loop formed between the biasing arm and the straight back member. This stress also causes the biasing arm not to spring back far enough when the clip is opened.

Another clip is shown in U.S. Design Pat. No. D393,688 to Essad, issued Apr. 21, 1998. In the Essad clip, the larger loop is formed by connecting the U-shaped hook of the biasing arm member to the smaller loop rather than the support member of the clip. Because the hook at the end of the biasing arm is not U-shaped, it releases with very low loads resulting in loss of fishing lures and fish. Additionally, the larger diameter of the loop results in a clip that has lower tensile strength. This causes the clip to deform very easily, thereby weakening the mechanical integrity of the clip and resulting in the eventual loss of lures and fish. The larger radius of the loop forming the biasing arm also results in lower biasing force in the arm.

SUMMARY OF THE INVENTION

The present invention overcomes the disadvantages of the clips described above by providing a clip for attaching an object to a line which is of simple construction and provides adequate resistance to unintentional opening while avoiding excessive metal fatigue upon repeated opening and closing thereof.

Accordingly, in one of its aspects, the present invention provides a clip for attaching an object to a line, comprising: first and second loop portions formed at respective proximal and distal ends of the clip; a central support member bridging the first and second loop portions and having a shoulder intermediate the proximal and distal ends of the clip; an arm member forming part of the first loop portion, the arm member having a first end connected to the support member through a bend at the proximal end of the clip and extending therefrom in generally opposed relation to the support member toward the distal end of the clip; and a U-shaped hook member connected to a second end of the arm member; the clip having an open position in which the U-shaped hook member is disengaged from the remainder of the clip; and the clip having a closed position in which the U-shaped hook member is received around the support member at a point distal to the shoulder, wherein the shoulder extends inwardly toward the arm member in a direction toward the distal end of the clip.

BRIEF DESCRIPTION OF THE DRAWINGS

The invention will now be more fully described, by way of example only, with reference to the accompanying drawings, in which.

DETAILED DESCRIPTION OF PREFERRED EMBODIMENTS

Figure 1:
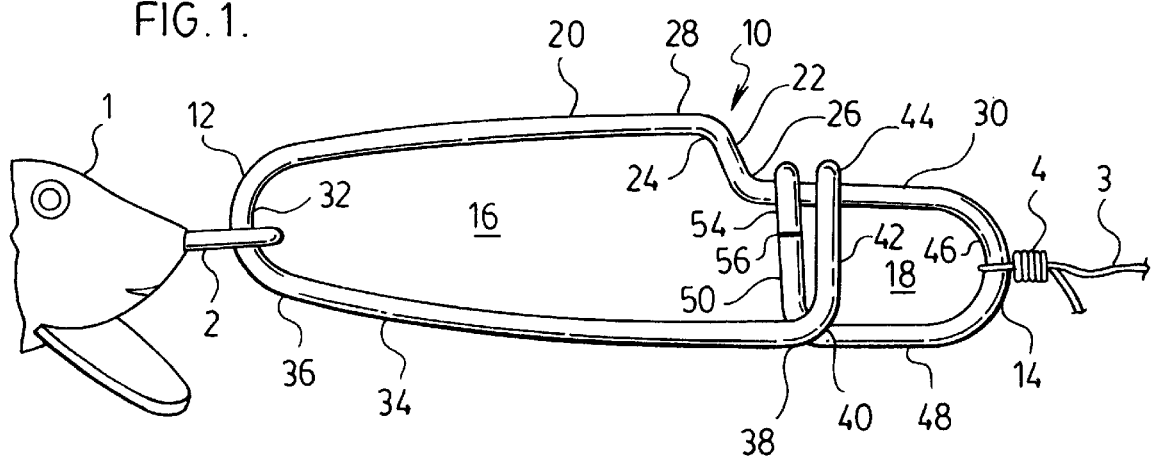
FIG. 1 is a side elevational view of a clip according to a preferred embodiment of the present invention in a closed position.

FIGS. 1 to 4 are enlarged views of a clip 10 for attaching an object to a line according to a preferred embodiment of the present invention. Clip 10 preferably has a length of about 17 mm and is comprised of a single strand of resilient, corrosion-resistant wire preferably having a diameter of about 0.5 mm. Clip 10 comprises an elongate body having a proximal end 12 and a distal end 14, with a first loop portion 16 (FIG. 1) being formed at the proximal end 12 of the clip, and a smaller, second loop portion 18 being formed at the distal end 14 of clip 10. FIG. 1 shows a fishing lure 1 having its eyelet 2 received by first loop portion 16, and a fishing line 3 tied to second loop portion 18 by knot 4.

Clip 10 includes a central support member 20 extending from the proximal end 12 to the distal end 14. The central support member 20 forms part of, and bridges, the first and second loop portions 16 and 18, and has a shoulder 22 formed intermediate its length. The shoulder 22 is formed by making two closely spaced bends 24 and 26 on central support member 20. The angles of bends 24 and 26 are preferably from about 115 to about 130 degrees, more preferably about 120 to 125 degrees, and are formed such that the portion 28 of support member 20 located proximally to the shoulder 22 is substantially parallel or at a slight angle to the portion 30 of central support member 20 which is located distally to the shoulder 22. The shoulder 22 preferably extends inwardly by a distance of about 2 mm, so that the width across clip at the distal end of shoulder 22 is about 3 mm and the width across clip at the proximal end of shoulder 22 is about 5 mm.

At the proximal end 12 of clip 10, the central support member 20 is connected through a bend 32 to a first arm member 34. As shown in FIG. 1, in which clip 10 is shown in its closed configuration, the first arm member 34 forms part of the first loop portion 16, having a first end 36 connected to bend 32 and extending therefrom in generally opposed relation to the support member 20 toward the distal end 14 of the clip 10.

Figure 2:
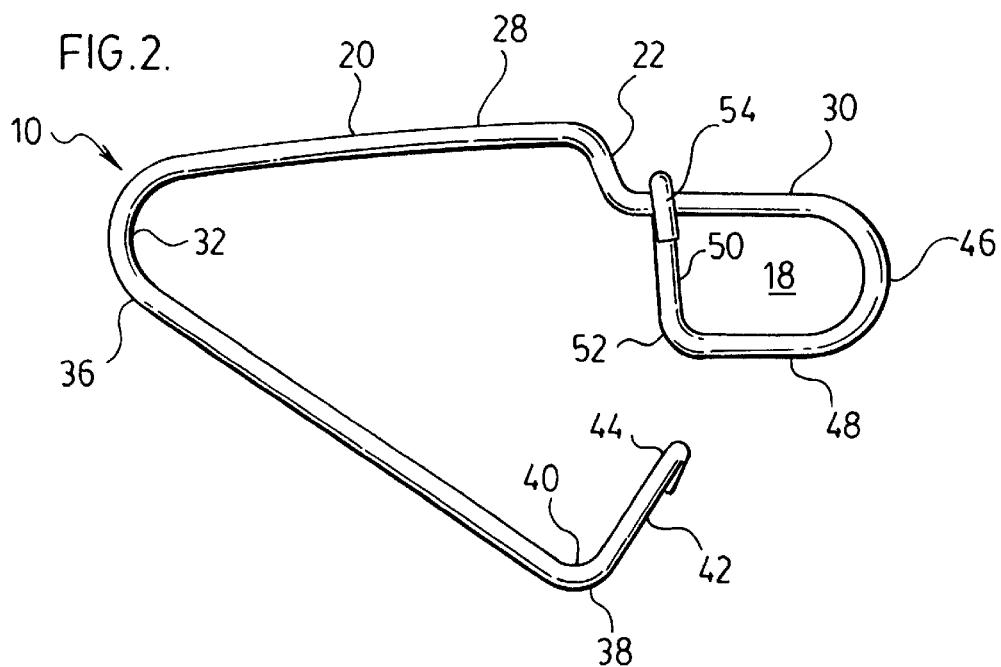
FIG. 2 is a side elevational view of the clip shown in FIG. 1 in an open position, taken from the same side as that shown in FIG. 1.
Figure 3:
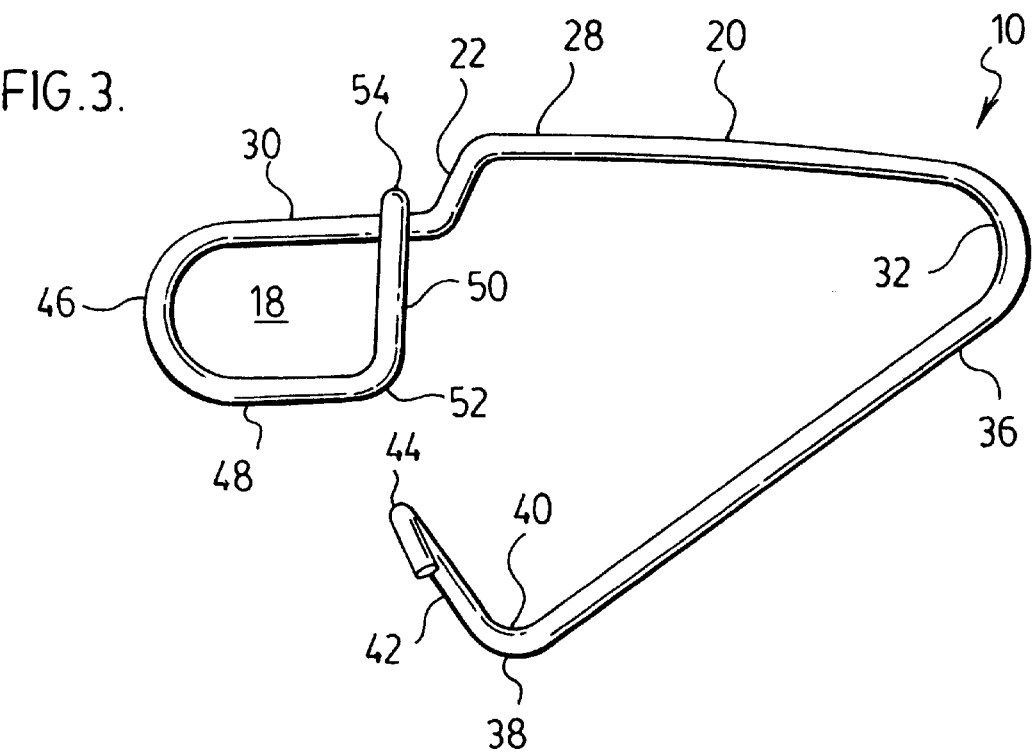
FIG. 3 is a side elevational view of the clip shown in FIG. 1 in an open position, taken from the side opposite that shown in FIGS. 1 and 2.
Figure 4:
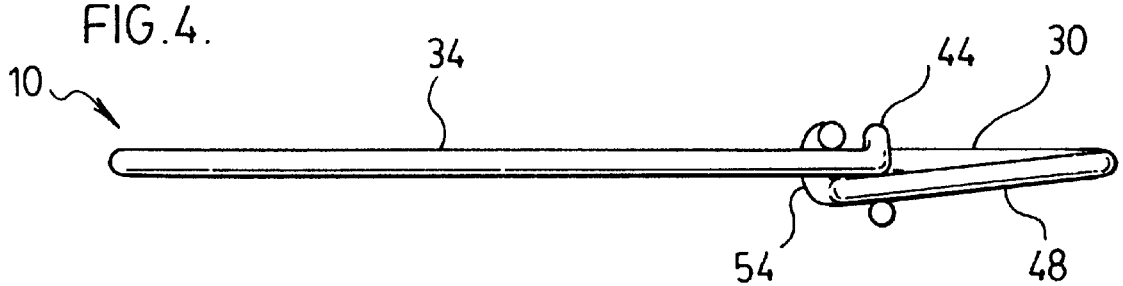
FIG. 4 is a bottom plan view of the clip of FIG. 1 in a closed position.

FIGS. 2 and 3 show clip 10 being open. In this configuration, first arm member 34 extends from bend 32 in a substantially straight line, forming an angle of about 30 to 40 degrees, more preferably about 35 degrees, to the proximal portion 28 of support member 20. Bend 32 of open clip 10 preferably has a radius of about 2 to 3 mm.

First arm member 34 has a second end 38 at which is formed a substantially right angle bend 40 about which the second end 38 of first arm member 34 is connected to a first transverse member 42 which extends toward support member 20. Preferably, the distance from the proximal end 14 of clip 10 to the end 38 of first arm member 34 is about 13 to 14 mm. At the end of the first transverse member 42 remote from bend 40, a first U-shaped hook member 44 is formed by bending the end of transverse member 42 back onto itself such that first hook member 44 lies in a plane which is substantially perpendicular to the plane containing support member 20, first arm member 34 and first transverse member 42. The bend about which first hook member 44 is formed has an inside diameter which is slightly larger than the diameter of the wire from which clip 10 is formed. Preferably, the wire has a diameter of about 0.5 mm and the inside diameter of first hook member 44 is about 1 mm.

The second loop portion 18 formed at the distal end 14 of clip 10 is formed by the distal portion 30 of central support member 20, which joins to a bend 46 at the distal end 14 of clip 10. The distal portion 30 of support member 20 is joined through bend 46 to a second arm member 48 extending from the bend 46 toward the proximal end 12 of clip 10. In the side views shown in FIGS. 1 to 3, the distal portion 30 of support member 20 and the second arm member 48 are preferably substantially parallel to one another. However, when viewed in the bottom plan view of FIG. 4, distal portion 30 and arm member 48 are seen to be at a slight angle to one another. Preferably, second loop portion 18 has a length of about 5 mm and a width of about 3 mm, with bend 46 preferably having a radius of about 1 to 1.5 mm.

The end of second arm member 48 remote from the bend 46 is connected to a second transverse member 50 through a bend 52 which is slightly greater than 90 degrees. As shown in FIGS. 2 and 3, a second U-shaped hook member 54 is formed at the end of transverse member 50 which is remote from bend 52. This second hook member 54 is formed in a plane which is substantially perpendicular to that containing second arm member 48 and second transverse member 50. The second U-shaped hook member 54 is wrapped around the distal portion 30 of central support member 20, the inside diameter of the bend from which hook member 54 is formed being slightly greater than the diameter of the wire comprising clip 10. Furthermore, U-shaped hook member 54 is formed in a direction opposite that of U-shaped hook member 44.

The opening and closing of clip 10 will now be described below.

In the open configuration of clip 10 shown in FIGS. 2 and 3, the first U-shaped hook member 44 is disengaged from the remainder of clip 10. The open configuration of clip 10 is its relaxed configuration, with no biasing force being exerted on first arm member 34. In this configuration, the proximal portion 28 of central support member 20 and the first arm member 34 are substantially straight, and the first U-shaped hook member 44 is spaced from the second loop portion 18 by a distance sufficient to allow an eyelet of a fish hook or fishing lure to be inserted therebetween and to be received on first arm member 34. Preferably, the distance from hook member 44 to the second loop portion 18 is about 1 to 2 mm.

The clip 10 is closed, i.e. from the open configuration shown in FIG. 2 to the closed configuration shown in FIG. 1, by squeezing the first arm member 34 and the central support member 20 together, for example between the thumb and forefinger, causing deformation of clip 10 about bend 32 and displacing first arm member 34 toward central support member 20. Displacement of first arm member 34 is continued until the tip 56 of hook member 44 is displaced past the distal portion 30 of support member 20 and is received around the distal portion 30 of support member 20. The total displacement of first arm member required to close clip 10 is preferably about 6 to 7 mm.

When the clip 10 is in the closed position shown in FIG. 1, arm member 34 is biased in the direction away from support member 20. The strength of this biasing force is sufficient to retain hook member 44 in its position received around support member 20, and is preferably of sufficient magnitude to prevent accidental opening of first loop portion 16 during use of clip 10.

Opening of first loop portion, i.e. from the configuration shown in FIG. 1 to the configuration shown in FIG. 2, is accomplished by squeezing together the first arm member 34 and the proximal portion 28 of central support member 20 until the tip 56 of hook 44 is clear of support member 20. The arm member is then allowed to spring away from support member 20 until it reaches the relaxed, open configuration shown in FIG. 2.

As shown in FIG. 1, when the first loop portion 16 is closed, the first and second loop portions 16 and 18 preferably intersect one another, with the second transverse member 50 and second U-shaped hook member 54 of the second loop portion 18 being situated proximally relative to the first transverse member 42 and first hook member 44 of the first loop portion 16. This intersection of the first and second loop portions 16 and 18 helps the clip 10 to resist accidental opening under tensile forces which are encountered during fishing, for example when the lure attached to clip 10 encounters an underwater obstruction or when a fish is hooked by the lure.

As discussed above, the shoulder 22 extends inwardly toward arm member 34 toward the distal end 14 of clip 10, thereby effectively reducing the distance between arm member 34 and support member 20 in the distal areas of the clip 10. When compared to prior art clips having a straight support member, it can be seen that the displacement of arm member 34 which is required to close the first loop portion 16 of clip 10 is substantially less than that required in prior art clips such as those described in the above-mentioned McMickle and Yong-Set patents, while the radius of the bend 32 at the proximal end 12 of clip 10 remains relatively unchanged. Therefore, the wire comprising clip 10 experiences substantially less fatigue at the bend 32 than in the prior art McMickle and Yong-Set clips. This ensures that the clip will spring open to the configuration shown in FIG. 2 to allow the easy addition or removal of a fishing lure or hook, and will retain its strength after a large number of openings and closings.

The preferred clip 10 according to the present invention has a streamlined shape in order to minimize interference with the movement of the lure and to minimize the possibility that it will become snagged in underwater obstacles, such as rocks, weeds and the like. To this end, the first arm member 34 and the second arm member 48 are preferably arranged end to end in a substantially straight line as shown in FIG. 1, and shoulder 22 and bends 32 and 46 at the proximal and distal ends of clip 10 are smoothly curved.

Although the invention has been described as being useful for attaching a fishing lure to a fishing line, it will be appreciated that the clip according to the invention could be produced in various sizes and could be used to attach various other objects to various other lines, ropes or cables.

Although the invention has been described in relation to certain preferred embodiments, it is to be understood that the invention is not restricted thereto. Rather, the invention includes all embodiments which may fall within the scope of the following claims.

What is claimed is:

1. A clip for attaching an object to a line, comprising:
    first and second loop portions formed at respective proximal and distal ends of the clip;
    a central support member bridging the first and second loop portions and having a shoulder intermediate the proximal and distal ends of the clip;
    an arm member forming part of the first loop portion, the arm member having a first end connected to the support member through a bend at the proximal end of the clip and extending therefrom in generally opposed relation to the support member toward the distal end of the clip; and
    a U-shaped hook member connected to a second end of the arm member;
    the clip having an open position in which the U-shaped hook member is disengaged from the remainder of the clip; and
    the clip having a closed position in which the U-shaped hook member is received around the support member at a point distal to the shoulder, wherein the shoulder extends inwardly toward the arm member in a direction toward the distal end of the clip.

2. The clip according to claim 1 wherein, when said clip is in the closed position, the arm member is urged away from the support member by a biasing force, thereby causing the U-shaped hook member to firmly engage the support member.

3. The clip according to claim 2, wherein said clip is opened by applying force to said arm member to move said arm member toward said central support member, thereby releasing the U-shaped hook member from the support member.

4. The clip according to claim 1, wherein said U-shaped hook member is connected to the arm member by a transverse member extending in a direction toward said support member.

5. The clip according to claim 4, wherein the U-shaped hook member extends from the second end of the arm member at a substantially right angle.

6. The clip according to claim 4, wherein the U-shaped hook member is formed in a plane perpendicular to a plane containing said arm member and said transverse member.

7. The clip according to claim 1, wherein the bend at the proximal end of the clip forms an angle of about 30 to 40 degrees between the central support member and the arm member when the clip is in the open position.

8. The clip according to claim 1, wherein the bend at the proximal end of the clip has a radius of about 2 to 3 mm when the clip is in the open position.

9. The clip according to claim 1, wherein the second loop portion comprises:
    a distal end portion of the support member;
    a bend at the distal end of the clip from which said distal end portion of the support member extends;
    an arm member extending opposite said distal end portion of the support member from the bend toward the proximal end of the clip;
    a transverse member extending at a substantially right angle from said arm member toward the distal end portion of the support member; and
    a U-shaped hook member received around the distal end portion of the support member.

10. The clip according to claim 7, wherein said first and second loop portions intersect one another such that, when the clip is in the closed position, the U-shaped hook member of the second loop portion is situated proximally relative to the U-shaped hook member of the first loop portion.

11. The clip according to claim 1, wherein said first loop portion is adapted to receive an eyelet of a fishing hook or lure when said clip is in the open position.

12. The clip according to claim 1, wherein the second loop portion is adapted to be connected to a fishing line.

13. The clip according to claim 12, further comprising a swivel attached to the second loop portion.

14. The clip according to claim 1, comprised of a corrosion resistant material.

15. The clip according to claim 14, comprised of a single strand of resilient metallic wire.

* * * * *